United States Patent
Aono et al.

(10) Patent No.: US 9,195,398 B2
(45) Date of Patent: Nov. 24, 2015

(54) INFORMATION STORAGE DEVICE AND METHOD

(71) Applicant: FUJITSU LIMITED, Kawasaki-shi (JP)

(72) Inventors: Yoshihisa Aono, Kawasaki (JP); Takashi Fujihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 250 days.

(21) Appl. No.: 13/832,327

(22) Filed: Mar. 15, 2013

(65) Prior Publication Data

US 2013/0262795 A1    Oct. 3, 2013

(30) Foreign Application Priority Data

Mar. 30, 2012 (JP) .................... 2012-082770

(51) Int. Cl.
| | | |
|---|---|---|
| *G06F 12/02* | (2006.01) | |
| *G06F 3/06* | (2006.01) | |
| *G06F 9/30* | (2006.01) | |
| *G06F 21/78* | (2013.01) | |

(52) U.S. Cl.
CPC ............ *G06F 3/0622* (2013.01); *G06F 9/3004* (2013.01); *G06F 21/78* (2013.01)

(58) Field of Classification Search
CPC ... G06F 12/14; G06F 12/1408; G06F 3/0622; G06F 9/3004; G06F 21/78
USPC ................................. 711/155, 163
See application file for complete search history.

(56) References Cited

U.S. PATENT DOCUMENTS

| | | | |
|---|---|---|---|
| 6,742,094 | B2 | 5/2004 | Igari |
| 2006/0253645 | A1 | 11/2006 | Lasser |
| 2008/0195799 | A1 | 8/2008 | Park |
| 2008/0201544 | A1 | 8/2008 | Nakajima et al. |
| 2009/0328238 | A1 | 12/2009 | Ridewood Glendinning |
| 2012/0124391 | A1* | 5/2012 | Aono ........................ 713/189 |

FOREIGN PATENT DOCUMENTS

| | | |
|---|---|---|
| JP | 2002-229859 | 8/2002 |
| JP | 2005-202476 | 7/2005 |
| JP | 2008-198049 A | 8/2008 |
| JP | 2008-282440 | 11/2008 |
| KR | 10-2008-0009314 A | 1/2008 |

OTHER PUBLICATIONS

Extended European Search Report dated Oct. 14, 2013 for corresponding European Application No. 13158535.8.

(Continued)

*Primary Examiner* — Hiep Nguyen
(74) *Attorney, Agent, or Firm* — Fujitsu Patent Center

(57) ABSTRACT

An information storage device includes a storage unit to which a storage region is assigned, a first management information storage unit that stores address information indicating an address range of the storage region in association with identification information identifying the storage region, and a processor that executes a procedure that includes acquiring the address information corresponding to the identification information from the first management information storage unit and accesses the storage region corresponding to the address information and rewriting the identification information stored in the first management information storage unit.

14 Claims, 16 Drawing Sheets

(56) References Cited

OTHER PUBLICATIONS

Korean Office Action mailed Jun. 2, 2014 for corresponding Korea Patent Application 10-2013-31750, with English Translation, 6 pages.

CNOA—Chinese Office Action mailed Jul. 1, 2015 for corresponding Chinese Patent Application No. 201310092805.9.

Japanese Office Action dated Sep. 24, 2015 for corresponding Japanese Patent Application No. 2012-082770, with Partial English Translation, 7 pages.

* cited by examiner

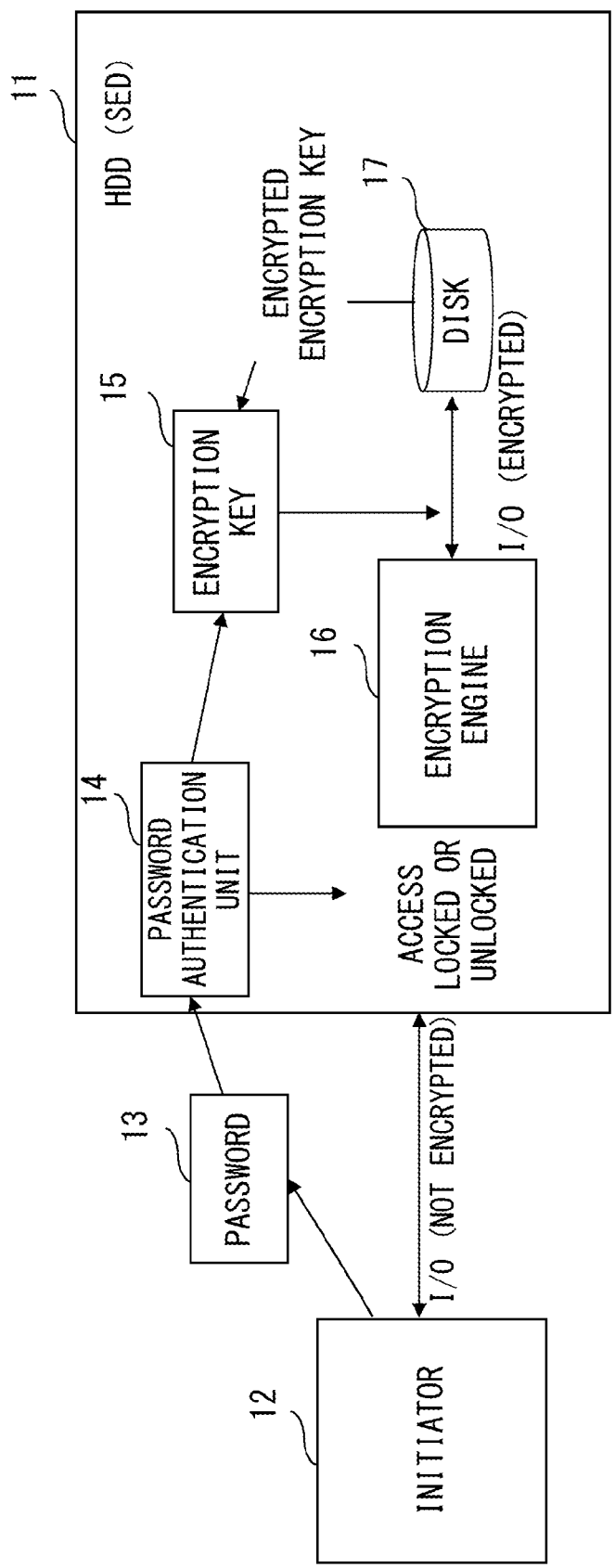
F I G. 1

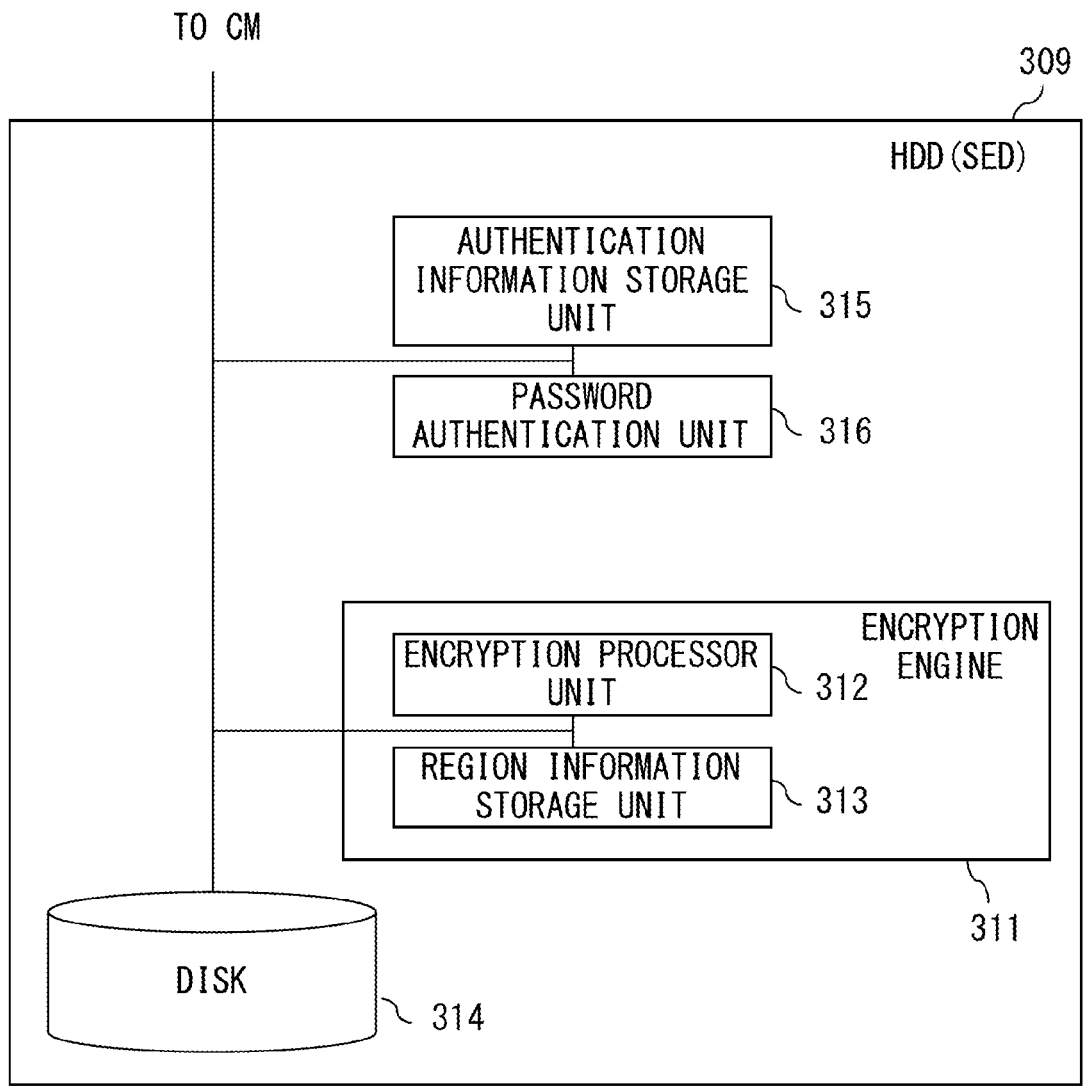
F I G. 4

| Byte/Bit | 7 | 6 | 5 | 4 | 3 | 2 | 1 | 0 |
|---|---|---|---|---|---|---|---|---|
| 0 | | | | | | | | |
| 1 | DATA VALID RANGE (EX. 0x0023=35 BYTES) | | | | | | | |
| 2 | | | | | | | | |
| 3 | BAND NUMBER (EX. 0x0002=2) | | | | | | | |
| 4 | | | | | | | | |
| 11 | START LBA 8byte (EX. 0x0x00000000000010000) | | | | | | | |
| 12 | | | | | | | | |
| 19 | LBA RANGE 8byte (EX. 0x0x00000000000010000) | | | | | | | |
| 20 | | | | | | | | |
| 21 | BAND NUMBER (EX. 0x0010=16) | | | | | | | |
| 22 | | | | | | | | |
| 29 | START LBA 8byte (EX. 0x0x00000000000020000) | | | | | | | |
| 30 | | | | | | | | |
| 37 | LBA RANGE 8byte (EX. 0x0x00000000000010000) | | | | | | | |

| Byte/Bit | 7 | 6 | 5 | 4 | 3 | 2 | 1 | 0 | |
|---|---|---|---|---|---|---|---|---|---|
| 0 | | | | VALID RANGE | | | | | — 601 |
| 1 | | | | | | | | | |
| 2–33 | | | DELETION PASSWORD 32byte | | | | | | — 602 |
| 34–65 | | | VENDOR PASSWORD 32byte | | | | | | — 603 |
| 66–67 | | | BAND NUMBER (0x001=1) | | | | | | — 604 |
| 68–75 | | | START LBA OF BAND 1 8byte | | | | | | — 605 |
| 76–83 | | | LBA RANGE OF BAND 1 8byte | | | | | | — 606 |
| 84–115 | | | PASSWORD OF BAND 1 32byte | | | | | | — 607 |
| 116 | VALID BIT | | | | | | | | — 608 / 612 |
| 117 | | | BAND NUMBER (0x002=2) | | | | | | — 609 |
| 118–125 | | | START LBA OF BAND 2 8byte | | | | | | — 610 |
| 126–133 | | | LBA RANGE OF BAND 2 8byte | | | | | | — 611 |
| 134–165 | | | PASSWORD OF BAND 2 32byte | | | | | | |
| | VALID BIT | | | | | | | | — 613 / 617 |
| | | | BAND NUMBER (0x0400=1024) | | | | | | — 614 |
| | | | START LBA OF BAND 1024 8byte | | | | | | — 615 |
| | | | LBA RANGE OF BAND 1024 8byte | | | | | | — 616 |
| | | | PASSWORD OF BAND 1024 32byte | | | | | | |

F I G. 7

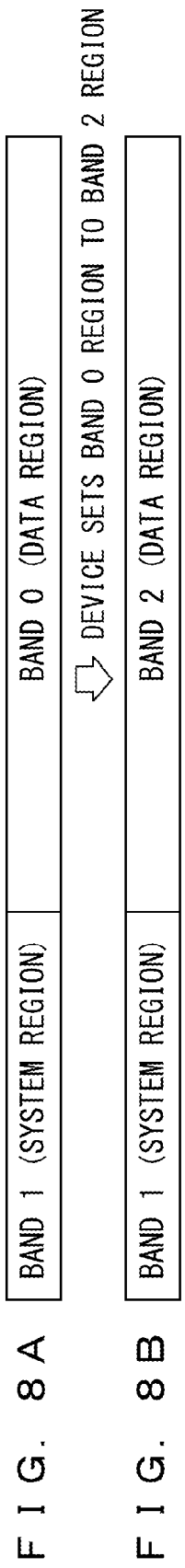

FIG. 9A

BAND 1 (SYSTEM REGION) | WHEN HOST PERFORMS I/O, USER DATA (EX. 11223344) IS WRITTEN IN BAND 2 REGION
BAND 2 (DATA REGION): 11223344 IS WRITTEN

FIG. 9B

BAND 1 (SYSTEM REGION) | WHEN HOST DOES NOT PERFORM I/O OR BEING SEPARATED FROM DEVICE, BAND 2 REGION IS RELEASED (BECOMES BAND 0)
BAND 0 (DATA REGION)

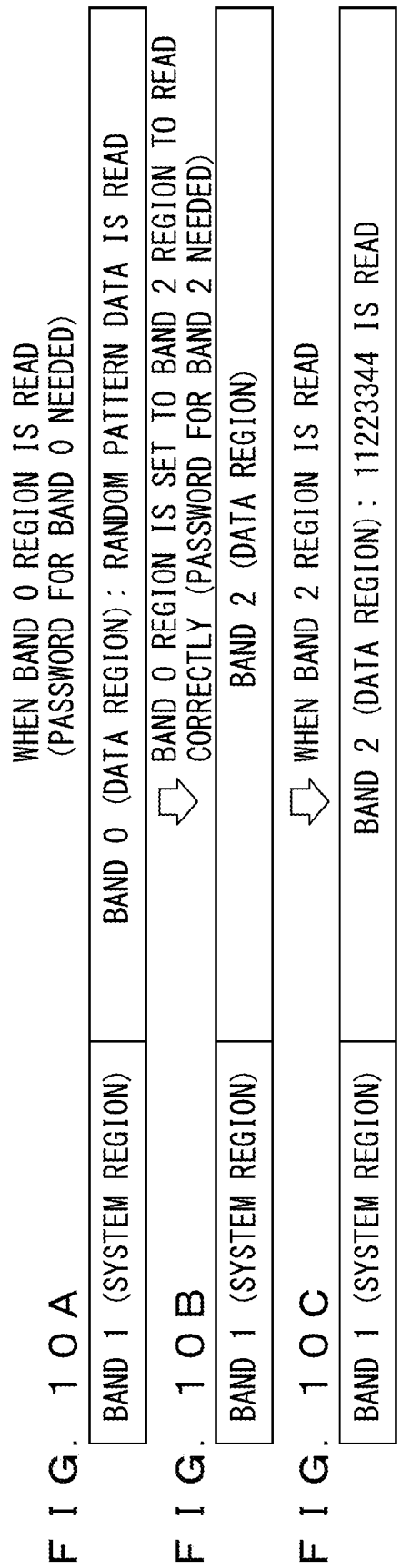

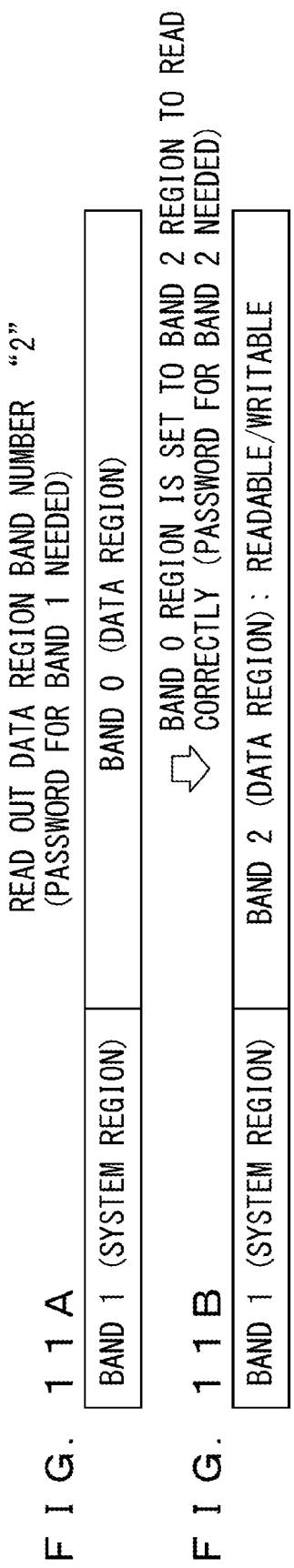

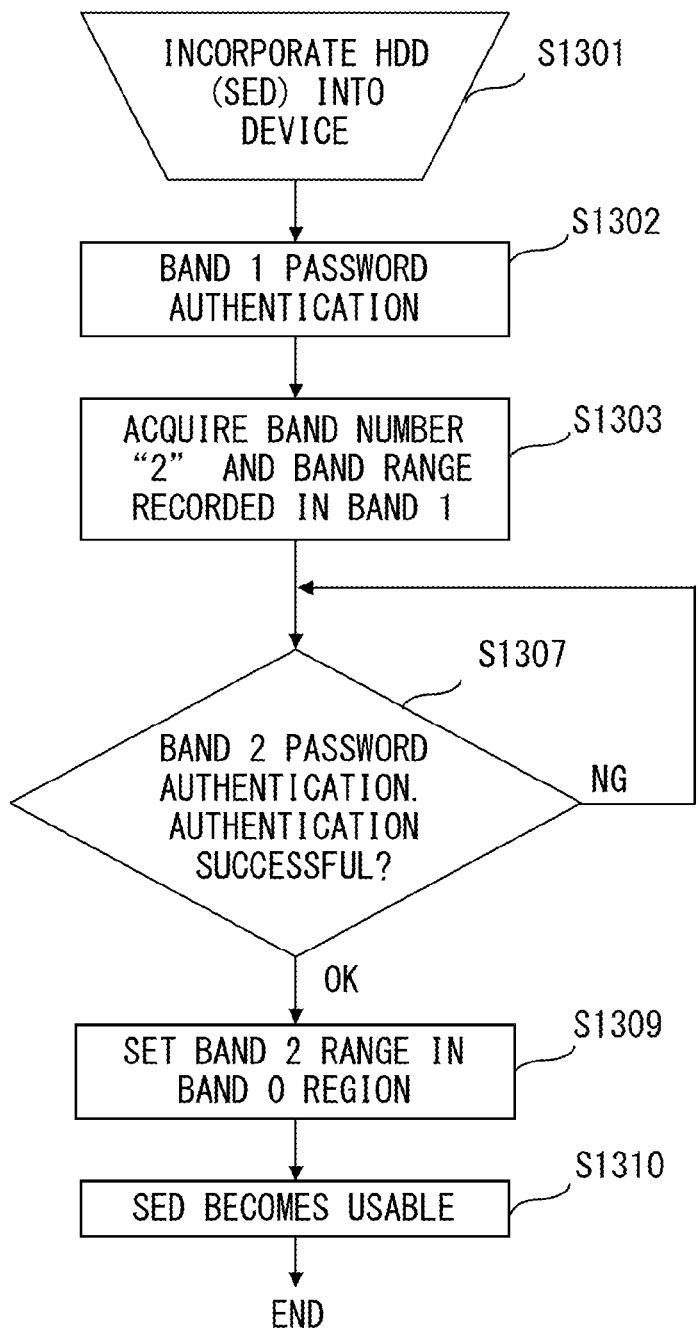
F I G. 1 5

INFORMATION STORAGE DEVICE AND METHOD

CROSS-REFERENCE TO RELATED APPLICATIONS

This application is based upon and claims the benefit of priority of the prior Japanese Patent Application No. 2012-082770, filed on Mar. 30, 2012, the entire contents of which are incorporated herein by reference.

FIELD

The present invention is related to a storage system.

BACKGROUND

RAID (Redundant Arrays of Inexpensive Disks) devices have been known as a storage device that handles plural HDDs (Hard Disk Drives) as a single logical volume.

In recent years, RAID devices have been used in places such as banks, hospitals, universities, and research centers where a large volume of information is handled, and security enhancement has been sought by using encryption functions of HDDs as measures to prevent leakage of important information.

As an encryption function of HDDs, a technology to encrypt data written in an HDD under an SED (Self-Encryption Drive) control has been known.

The SED can provide security to data written in media by means of an HDD itself encrypting the data on the media. The SED can also provide security to data accesses by password authentication.

In the SED, a unit of logical storage regions on HDDs is referred to as a band, and disk management is carried out in units of bands. A band is determined as an arbitrary range of an LBA (Logical Block Address) in HDDs.

In the technology of HDD encryption by SED control, storage systems that carry out password authentication in units of bands have been known.

Patent Document 1: Japanese Laid-Open Patent Publication No. 2002-229859
Patent Document 2: Japanese Laid-Open Patent Publication No. 2005-202476
Patent Document 3: Japanese Laid-Open Patent Publication No. 2008-282440

However, if a third party obtains a password for a band at the time of accessing data in the SED, the third party may be able to obtain information in the HDD. Because the recent RAID devices are often used for storing personal information or research results in the banks and research centers, leakage of the important information causes tremendous damage.

SUMMARY

According to an aspect of the embodiment, an apparatus includes a storage unit, a first management information storage unit, an access controller unit, and an identification information rewrite unit. Storage regions are assigned to the storage unit. The management information storage unit associates address information indicating address ranges of storage regions with identification information identifying the storage regions and stores the information. The access controller unit acquires the address information associated with the identification information from the first management information storage unit and accesses the storage region corresponding to the acquired address information. The identification information rewrite unit rewrites identification information stored in the first management information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a diagram explaining an SED;
FIG. 4 illustrates an example of a configuration of an HDD (SED) according to the present embodiment;
FIG. 6 illustrates an example of a data structure of management information stored in a system region of the HDD (SED);
FIG. 7 illustrates an example of a data structure of management information stored in a management information storage unit of a RAID device;
FIGS. 8A and 8B are diagrams explaining a state of the HDD (SED) in a default setting;
FIGS. 9A and 9B are diagrams explaining a state of the HDD (SED) during operation;
FIGS. 10A, 10B, and 10C are diagrams explaining a state of the HDD (SED) at the time of being stolen;
FIGS. 11A and 11B are diagrams explaining a state of the HDD (SED) at the time of re-mounting;
FIG. 15 is a flowchart from a point in time of re-mounting the HDD (SED) to the RAID device to a point in time at which the HDD (SED) becoming usable.

DESCRIPTION OF EMBODIMENTS

Figure 2:
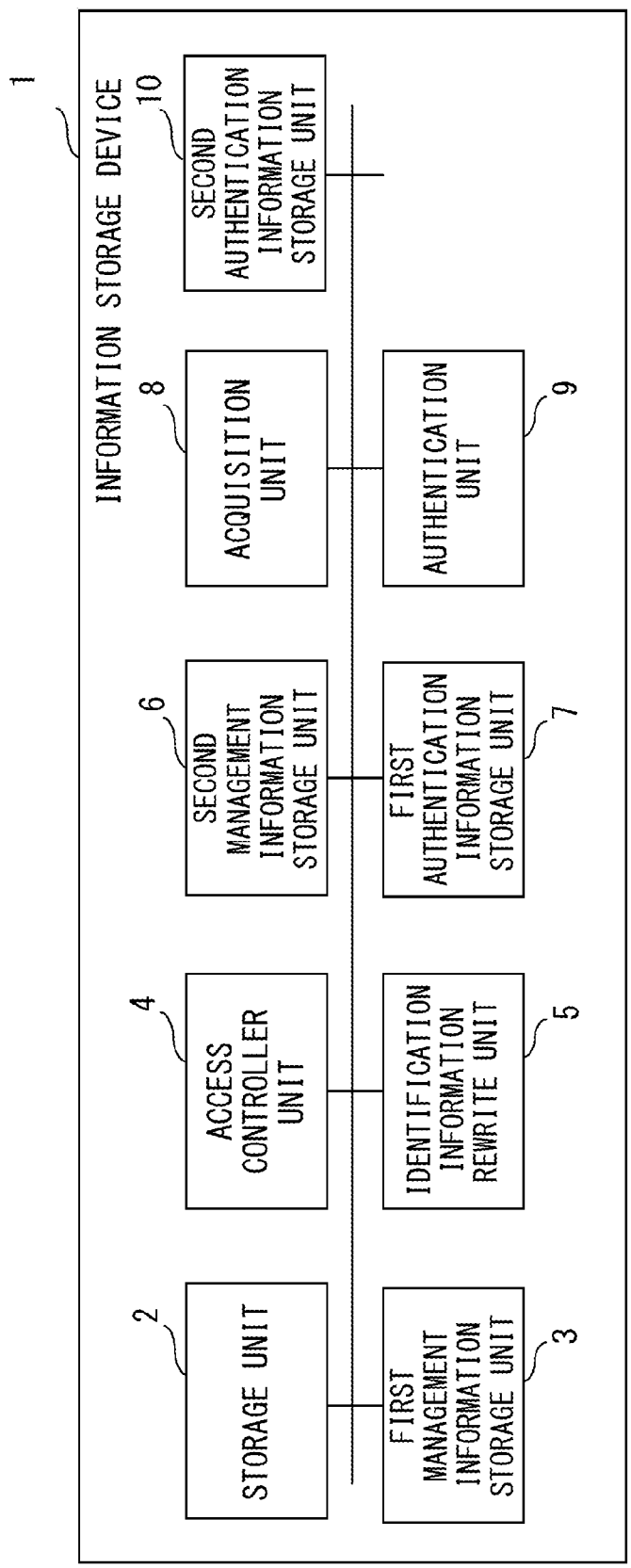
FIG. 2 illustrates an example of a storage system according to the present embodiment.

FIG. 1 illustrates a structure of password authentication in a RAID apparatus that uses an SED technology.

An initiator 12 outputs a command such as reading and writing data to an HDD (SED) 11 connected to the initiator 12. The initiator 12, firstly, inputs a password 13 to the HDD (SED) 11. A password authentication unit 14 performs authentication of the input password 13. When the authentication succeeds, a restriction on access to the HDD (SED) 11 is removed. When the initiator 12 inputs/outputs data to/from a disk 17, an encryption engine 16 performs encryption/decryption processing of the data by using an encryption key 15.

The encryption key 15 is a parameter given to the calculation procedure used when the encryption engine 16 encrypts data. The encryption key 15 is created randomly by the HDD (SED) 11 and cannot be set or referred to from outside.

However, an instruction to change the encryption key 15 can be given from outside. The encryption key 15 is changed in units of band.

Changing the encryption key 15 is the same as erasing data. This is because when a new encryption key 15 is set, previous data in the disk 17 is decrypted by using the new encryption key 15 to be read out, and the previous data that is read consequently loses its meaning. The encryption key 15 is not changed even if a password for a band is changed. The value of the encryption key 15 is different for each of the created bands. For example, when a band 1 and a band 2 are created, the encryption key 15 for the band 1 and the encryption key 15 for the band 2 are different values.

At the time of deleting an encryption key, authentication called an erase master is performed by using another password that is different from the password of the band. After the encryption key is deleted, the disk 17 is in an unlocked state. Afterwards a new encryption key 15 is set and initialization of the band password (restoring a password originally set by a vendor) is performed. The password originally set by a vendor can be electrically obtained through an interface of the SED.

Note that in the password authentication, when the number of times authentication fails exceeds a preset threshold, the act of authentication itself becomes impossible, and as a result, the disk 17 of the HDD (SED) 11 becomes unusable.

FIG. 2 illustrates an example of a storage system of the present embodiment. An information storage device 1 includes a memory unit 2, a first management information memory unit 3, an access controller unit 4, an identification information rewrite unit 5, a second management information memory unit 6, a first authentication information storage unit 7, an acquisition unit 8, an authentication unit 9, and a second authentication information storage unit 9.

The memory unit 2 has a memory region assigned.

The first management information memory unit 3 associates address information that indicates an address range of the memory region with identification information to identify the memory region and it stores the information.

The access controller unit 4 acquires the address information corresponding to the identification information from the first management information memory unit 3 and accesses the memory region corresponding to the acquired address information.

The identification information rewrite unit 5 rewrites identification information stored in the first management information memory unit 3.

The second management information memory unit 6 associates the address information indicating an address range of a memory region with second identification information to identify the memory region and stores the information.

The first authentication information storage unit 7 stores the first authentication information set in association with the identification information.

The acquisition unit 8 acquires the second authentication information.

The authentication unit 9 checks the second authentication information acquired from the acquisition unit 8 against the first authentication information stored in the first authentication information storage unit 7, and when the check result is that the information is in agreement, the authentication unit 9 enables the access control unit 7 to access the storage unit 5.

The second authentication information storage unit 10 includes third authentication information that enables the identification information rewrite unit 5 to access the second management information memory unit 6. The authentication unit 9 acquires third authentication information stored in the second authentication information storage unit 10, checks the acquired third authentication information against fourth authentication information stored in the first authentication information storage unit 7, and enables the identification information rewrite unit 5 to access the second management information storage unit 6 when the check result is that the information is in agreement.

As described above, the access controller unit 4 acquires address information corresponding to identification information and accesses a memory region corresponding to the acquired address information. As a result, when the identification information corresponding to the address information is rewritten, the access controller unit 4 cannot access the original memory region to be accessed. In this manner, it is possible to enhance security in the information storage device 1.

The authentication unit 9, in addition to the authentication of the access controller unit 4 to access the memory unit 2, authenticates the identification information rewrite unit 5 to access the second management information memory unit 6. In other words, a two-step authentication has been implemented by the time the memory unit 2 becomes usable from the outside. In this manner also, it is possible to enhance security in the information storage device 1.

Figure 3:
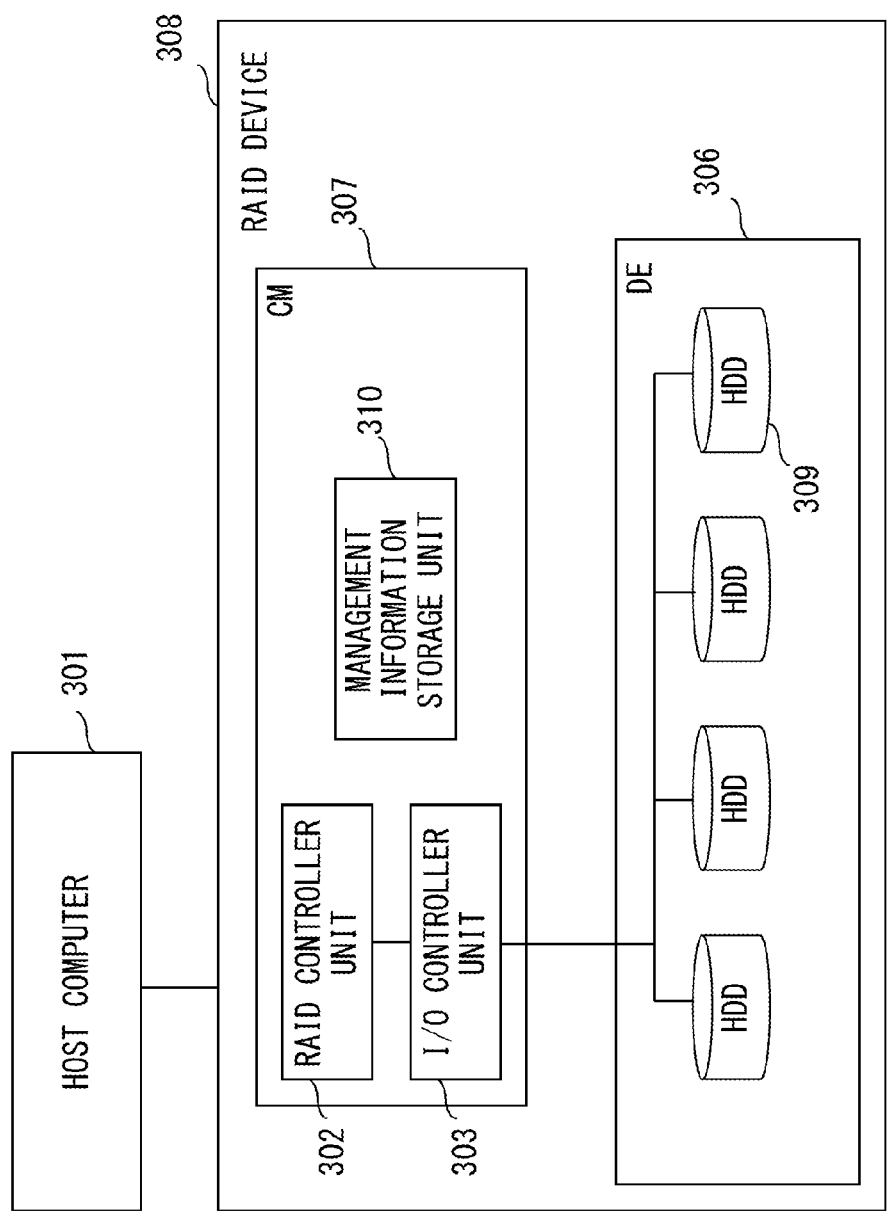
FIG. 3 illustrates an example of a configuration of the storage system according to the present embodiment.

FIG. 3 is a diagram illustrating an example of a configuration of a storage system of the present embodiment. A RAID device 308 illustrated in FIG. 3 is a RAID device that configures a virtual drive by using multiple HDDs (SEDs) 309 as an example.

The RAID device 308 includes a controller module (hereinafter abbreviated as CM) 307 and a disk enclosure (hereinafter abbreviated as DE) 306. The RAID device 308 is connected to a host computer 301, which serves as a higher-order apparatus, and the host computer 301 gives commands to input/output processing requests or data to/from the RAID device 308. The DE 306 stores data input to/output from the host computer 301. The CM 307 controls access to the HDD (SED) 309 by using the SED technology.

Here, the RAID device 308 may be configured so as to transmit/receive data to/from other disk array devices (not illustrated) configured in the same manner as or in a similar manner to the RAID device 308 of the present embodiment.

The DE 306 has multiple HDDs (SEDs) 309 mounted on it.

The CM 307 includes a RAID controller unit 302, an I/O controller unit 303, and a management information storage unit 310. The RAID controller unit 302 mainly controls the entire RAID device 308. The I/O controller unit 303 controls an input/output (command) to/from the HDD (SED) 309. From the command from the RAID controller unit 302, the I/O controller unit 303 issues a command and controls the SED.

The RAID controller unit 302 creates bands (band 1 to band X, where X is an arbitrary integer) in the HDD (SED) 309 and sets a password for each band (band 1 to band X and band 0). The creation of bands and password setting are explained later.

The RAID controller unit 302 is an example of the access controller unit 4, the identification information rewrite unit 5, and the acquisition unit 8. The management information storage unit 310 is an example of the second authentication information storage unit 10.

Next, the HDD (SED) 309 is explained with reference to FIG. 4.

FIG. 4 is a diagram illustrating an example of a configuration of the HDD (SED) 309 of the present embodiment. The HDD (SED) 309 includes an encryption engine 311, a disk 314, an authentication information storage unit 315, and a password authentication unit 316.

The encryption engine 311 includes an encryption processor unit 312 and a region information storage unit 313. The encryption processor unit 312 encrypts data input to the HDD (SED) 309 and stores the data in the disk 314. The encryption processor unit 312 also decrypts the data in the disk 314 and outputs it. The region information storage unit 313 stores a region management table for managing a setting status of the bands established in the HDD (SED) 309. The encryption processor unit 312 recognizes the bands currently established in the HDD (SED) 309 by using the information in the region management table and performs encryption and decryption of data.

The authentication information storage unit 315 stores passwords that are set for each of the bands. The authentication information storage unit 315 is an example of the first authentication information storage unit 7.

The password authentication unit 316 checks a password stored in the authentication information storage unit 315 against a password input from the RAID controller unit 302, and when the check result is that the passwords are in agreement, the password authentication unit 316 allows for access to the band corresponding to the password. A band and a password correspond one-to-one with one another. An example of the password authentication unit 316 is the authentication unit 9.

Note that when the HDD (SED) 309 is powered off by being detached from the RAID device 308, the HDD (SED) 309 is locked and becomes inaccessible. When the HDD (SED) 309 is powered on and used the next time, the password authentication for each band is conducted once again in the password authentication unit 316, and when the authentication succeeds, the lock of the HDD (SED) 309 is released.

The disk 314 is a region in which data input to the HDD (SED) 309 is actually stored. An example of the disk 314 is the memory unit 2.

Bands are explained next.

A band is established when the RAID controller unit 302 designates a range of an LBA of the disk 314 of the HDD (SED) 309. A region other than the bands (1 to X, X=an arbitrary integer) set by the RAID controller unit 302 is referred to as a global band (band 0). In other words, when no band is established in the HDD (SED) 309, all regions are the global band (band 0). When a band is established, it is interpreted that the region of the global band (band 0) is in a state of the established band. Furthermore, cancellation of the band establishment in a region is interpreted as that the region becoming a global band (band 0).

A band setting status is managed in the region management table stored in the region information storage unit 313 of the encryption engine 311. An example of the region information storage unit 313 is the first management information storage unit 3.

The region management table includes a band number of a band to be established and band range information that is associated with the band number. The band range information includes a band start LBA and an LBA range. An operation to establish a band in the HDD (SED) 309 specifically refers to operations to associate the band range information to be set to the HDD (SED) 309 with a band number to be set and to set it in the region management table. In other words, the operation to establish a band is an operation in which a band number associated with a range indicated by the range information to be set is rewritten from a number indicating a global band to a number indicating a band to be established in the region management table. The encryption engine 311 encrypts data to be written in the HDD (SED) 309 for each of the bands set in the region management table by using different encryption keys.

On the other hand, the band establishment is canceled by setting a value of the range information of the band associated with the set band number to 0 in the region management table. In such a case, the range indicated by the range information set before the cancellation of a band establishment is associated with the band 0 in the region management table.

Note that when a band is established in the band 0 region and this band establishment is canceled before data is written, it is possible to read data in the original band 0.

Authentication password setting, changes in encryption keys, and unlock operations are performed in units of a band. The number of bands that can be established is a vendor-dependent value. Although the band size is not limited, data cannot be read or written such that it is crossing a border of the bands. Furthermore, a band is a continuous region and an LBA of one band does not overlap that of others.

In bands other than the global band (band 0), the range of the LBA cannot be discontinuous, but the range of the LBA can be discontinuous in the global band (band 0).

Figure 5:
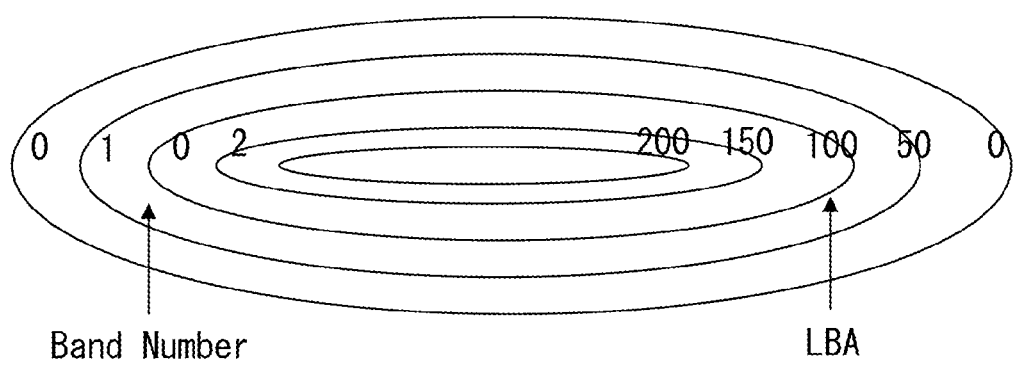
FIG. 5 illustrates a diagram explaining a band.

FIG. 5 is a diagram to explain bands, and the association between bands and LBAs when bands 1 and 2 are established is illustrated. In the case of the example in FIG. 5, the range of the LBA of the band 1 is 50 to 100, and the range of the LBA of the band 2 is 150 to 200. The range of the LBA of the band 0 (global band) is regions other than the band 1 and the band 2, which are 0 to 50 and 100 to 150. As described above, the LBA of the band 0 can be discontinuous regions.

In the present embodiment, a region of the HDD (SED) 309 that actually inputs data to or outputs data from the host computer 301 is referred to as a data region. The data region is configured of one or more bands. A user of the RAID device 308 can designate the number of bands to be used as data regions. The RAID controller unit 302 randomly determines the band numbers for each of the bands to be used as data regions designated by a user. The user of the RAID device 308 is not able to confirm the band numbers determined here.

A region to store management information of bands used as data regions is referred to as a system region. In the following description of the present embodiment, the band 1 is set to the system region. The system region in the HDD (SED) 309 is an example of the second management information storage unit 6.

FIG. 6 illustrates an example of data structure of management information stored in the band 1, which serves as a system region.

The management data stored in the band 1 includes a valid range 501, a band number 502, a start LBA 503, and an LBA range 504 for each piece of data. When there are multiple bands used as a data region, information of the band number, the start LBA, and the LBA range is stored for each of the bands used as a data region. The example in FIG. 6 illustrates a data structure when there are two bands used as a data region.

The valid range 501 stores a valid LBA range as data of the band 1. For example, when two bands are used as a data region, "0x0023" is stored in the valid range 501.

The band number 502 stores the band numbers of the bands used as a data region. The band numbers of the bands used as a data region are randomly determined by the RAID controller unit 302. For example, when the band number of the bands used as a data region is "2", "0x0002" is stored in the band number 502. Here, the user of the RAID device 308 cannot check these band numbers of the bands used as a data region, which is determined by the RAID controller unit 302.

The start LBA 503 and the LBA range 504 store a value of the start LBA corresponding to the band number 502 and a range of the LBA corresponding to the band number 502, respectively. For example, when the band range corresponding to the band number 502 is "LBA=0x10000 to 0x1FFFF", "0x00000000000010000" is stored in the start LBA 503, and "0x00000000000010000" is stored in the LBA range 504.

Furthermore, when there is another band used as a data region, the corresponding band information is stored in a band number 505, a start LBA 506, and an LBA range 507 in a similar manner as the band number 502 to the LBA range 504. For example, when the band number is "16", "0x0010" is stored in the band number 505. When the range of the band 16 is "LBA=0x20000 to 0x2FFFF", "0x00000000000020000" is stored in the start LBA 506, and "0x00000000000010000" is stored in the LBA range 507.

Similarly, when there are multiple bands used as a data region, information of the band number, the start LBA, and the LBA range for each of the used bands is stored in the band 1. Accordingly, the value of the valid range 501 changes in accordance with the number of bands used as a data region.

Next, a data structure of management information stored in the management information storage unit 310 of the CM 307 is explained.

FIG. 7 illustrates an example of a data structure of management information stored in the management information storage unit 310. Note that FIG. 7 illustrates an example of a data structure when the band 1 is used as a system region.

The management information stored in the management information storage unit 310 includes a valid range 601, a deletion password 602, a vendor password 603, a band number 604, a band 1 start LBA 605, and a band 1 LBA range 606. Furthermore, depending on the number of bands, information such as the valid bit, the band number, the start LBA, the LBA range, and the password is stored for each of the bands. The example of FIG. 7 illustrates a data structure when the number of bands is 1024.

The valid range 601 indicates a range of data valid as management information stored in the management information storage unit 310.

The deletion password 602 is information of an authentication password (erase master) to delete an encryption key. The deletion password 602 is arbitrarily set by the RAID controller unit 302.

The vendor password 603 is information of a band password that is originally set by the vendor. When the band password is initialized, this originally set band password is restored.

Information related to the band 1 is stored in the band number 604 to the band 1 password 607.

The band number 604 stores "0x001", for example, which is the band number of the band 1. The start LBA 605 of the band 1 stores a value of the starting LBA of the band 1. The LBA range 606 of the band 1 stores information of a range of the LBA of the band 1. The password 607 of the band 1 stores password information of the band 1. Here, the password of the band 1, which is a system region, is created by the RAID controller unit 302.

The band number 608 to the valid bit 612 store information related to the band 2. Information of the band number, the start LBA, the LBA range, and a password is stored in the same manner as the band 1. The value of the valid bit 612 indicates whether or not the band 2 is used as a data region. In other words, when the band 2 is used as a data region, the value of the valid bit 612 is "1", and if this is not the case, the value of the value of the valid bit 612 is "0".

Afterwards, similar information is stored for each of the bands. In the example of FIG. 7, because the number of bands is 1024, information of the band 3 to the band 1023 is stored subsequent to the information of the band 2, and the information of the band 1024 is stored in the band number 613 to the valid bit 617 at the end. Here, the password of the bands used as a data region is determined by the user of the RAID device 308. Meanwhile, the password of the bands that are not used as a data region is determined randomly by the RAID controller unit 302.

Next, a transition of the band states in the HDD (SED) 309 recognized by the RAID controller unit 302 that accesses the HDD (SED) 309 through the region management table in the present embodiment is explained with reference to FIG. 8 to FIG. 11. Similarly to the foregoing descriptions, bands used as a system region are referred to as a band 1 in the following description. In the following descriptions, the operation to set a band in the HDD (SED) 309 refers to an operation in which the RAID controller unit 302 sets the range information of a band to be set to a region management table in association with the band number to be set, as described in the foregoing descriptions. The operation to cancel a band establishment refers to an operation in which the RAID controller unit 302 sets the value of the range information of a band in the region management table to 0. Therefore the data stored in the HDD (SED) 309 is not changed before or after the band establishment.

Firstly, the change in a state of the HDD (SED) 309 in the default setting of the band being used as a data region, which is recognized by the RAID controller unit 302, is explained.

When the HDD (SED) 309 is mounted to the RAID device 308 and is used, a band to be used as a data region is randomly determined from among the band 2 to the band X by the RAID controller 302. The number of the bands used as a data region is designated by the user of the RAID device 308, and the RAID controller unit 302 sets the designated number of bands to be a data region. The user of the RAID device 308 is not able to check the band numbers, which is determined by the RAID controller unit 302. In the following description of the present embodiment, the band 2 is selected as a band used as a data region.

FIG. 8A and FIG. 8B are diagrams to explain the state when the region of the band 2 used as a data region is established. When the band used as a data region has not been established, the HDD (SED) 309 includes a region of the band 1 that is a system region and a region of the global band (band 0) (FIG. 8A). Meanwhile, when the RAID controller unit 302 establishes the band 2 region, the RAID controller unit 302 recognizes the region of the band 0 as a region of the band 2 as illustrated in FIG. 8B. Note that although the entire region of the band 0 is recognized as the band 2 in FIG. 8B, the actual region that is set as the band 2 is a range designated in the start LBA 503 and the LBA range 504.

The password of the band 2 used as a data region is set by the use of the RAID device 308. In other words, password information set by the user of the RAID device 308 is associated with a band number and stored in the authentication information storage unit 315.

Next, the band number "2" of the band 2 and information on the start LBA and the LBA range of the band 2 are stored in the band 1.

Next, information on all bands is stored in the management information storage unit 310 as management information. In other words, the band number, the start LBA, the LBA range and the password in the management information stored in the management information storage unit 310 are set to each of the bands. In addition, the password information set by the user of the RAID device 308 is stored in the password 611 of the band 2 in the management information stored in the management information storage unit 310. The passwords for bands other than the band 2, i.e., the band 0 to the band X that are not used as a data region, are randomly set by the RAID controller unit 302. Furthermore, the valid bit of the band used as a data region is set to "1".

Note that the order of the processing to set the region used as a data region, the processing to store the information in the band 1, and the processing to store the information to the management information storage unit 310 may be different.

Next, the change in the state during operation of the HDD (SED) 309, which is recognized by the RAID controller unit 302, is explained.

FIGS. 9A and 9B are diagrams to explain the state during operation of the HDD (SED) 309 which is recognized by the RAID controller unit 302. During the operation, switching between two states, a state in which a data region band is established and a state in which a data region band establishment is canceled, is performed in the HDD (SED) 309.

When there is an input from/output to the host computer 301, the HDD (SED) 309 is operated in a state in which correct range information is set to the LBA range information corresponding to the band number of the band (the band 2 in the example of FIGS. 9A and 9B) of the data region. This state is recognized by the RAID controller unit 302 as a state in which the band 1 that is a system region and the band 2 that is a data region are established in the HDD (SED) 309.

Data input/output is performed on the band 2 established as a data region (FIG. 9A). In other words, the data actually stored is encrypted with the encryption key corresponding to the band 2 and is stored in the region of the band 2 of the HDD (SED) 309. For example, in the example of FIG. 9A, 11223344 is written in the band 2 by the host computer 301.

When there is no input from/output to the host computer 301, the value of the range information of the band 2 set in the region management table is set to 0. This state is recognized by the RAID controller unit 302 as a state in which the band 1 that is a system region and the global band (band 0) are established in the HDD (SED) 309 (FIG. 9B).

In the state of FIG. 9B, when the data in the HDD (SED) 309 is read, the data is decrypted by using the encryption key of the band 0, and for that reason, the data written when the band 2 is established cannot be read. Accordingly, the data input in FIG. 9A, 11223344, is not read in the state of FIG. 9B.

In addition, when the RAID controller 302 issues a command to separate the HDD (SED) 309 from the RAID device 308, the state in FIG. 9B is also attained. The actual separation is performed after the information of a band used as a data region is deleted from the management information storage unit 310 after the state is switched into the state in FIG. 9B.

The timing to switch the states during operation is such that the RAID controller unit 302 determines whether or not there is any input/output between the host computer 301 and the band 2 at intervals of a certain time period, and switches the states based on the determination result. More specifically, when the determination result is such that there is an input/output, the state is switched to the state in FIG. 9A, and when the determination result is such that there is no input/output, the state is switched to the state in FIG. 9B.

As described above, a band that is a data region is established only when an input/output request is issued from the host computer 301, and security is more enhanced compared with a case in which a data region band is established continuously.

Next, the state at the time of being stolen of the HDD (SED) 309 which is recognized by the RAID controller unit 302 is explained.

FIGS. 10A, 10B, and 10C are diagrams to explain the state at the time of being stolen of the HDD (SED) 309 which is recognized by the RAID controller unit 302. The HDD (SED) 309 at the time of being stolen is in a state in which the HDD (SED) 309 is separated from the RAID device 308, and therefore as explained with reference to FIGS. 9A and 9B, the band 1 that is a system band and the global band (band 0) are established (FIG. 10A). In this state, if the band 0 region is read by using the password of the band 0, the read data is random pattern data. In order to read the data stored in the data region in such a way as to make sense, firstly, the range information of the band 2 has to be correctly set in association with the band number of the band 2 in the region management table (FIG. 10B). In addition to correctly setting the range information of the band 2, the password authentication for the band 2 has to be successful (FIG. 10C). For that reason, more enhanced security is expected, compared with a case of using a password lock only. If the LBA range matches, correct data may be read. However, in view of such a case, the band establishment should be refined so that the range that is read can be maintained to a limited extent.

Next, a state of the HDD (SED) 309 when the HDD (SED) 309 is mounted once again on the RAID device 308 is explained.

FIGS. 11A and 11B are diagrams to explain the state of the HDD (SED) 309, which is recognized by the RAID controller unit 302, when the HDD (SED) 309 is mounted once again on the RAID device 308. Immediately after the HDD (SED) 309 is mounted once again on the RAID device 308, the band 1 that is a system region and the global band (band 0) have been established (FIG. 11A). After re-mounting the HDD (SED) 309, the password authentication of the band 1 is performed by the password authentication unit 316. After successful password authentication of the band 1, information of the band 2 used as a data region is read from the band 1, and based on this information, the value of the range information of the band 2 is set in the region management table. In other words, the RAID controller unit 302 recognizes that the region of the band 0 is set to the band 2 (FIG. 11B).

Next, in the following description, a flow of SED control in the present embodiment is explained.

Figure 12:
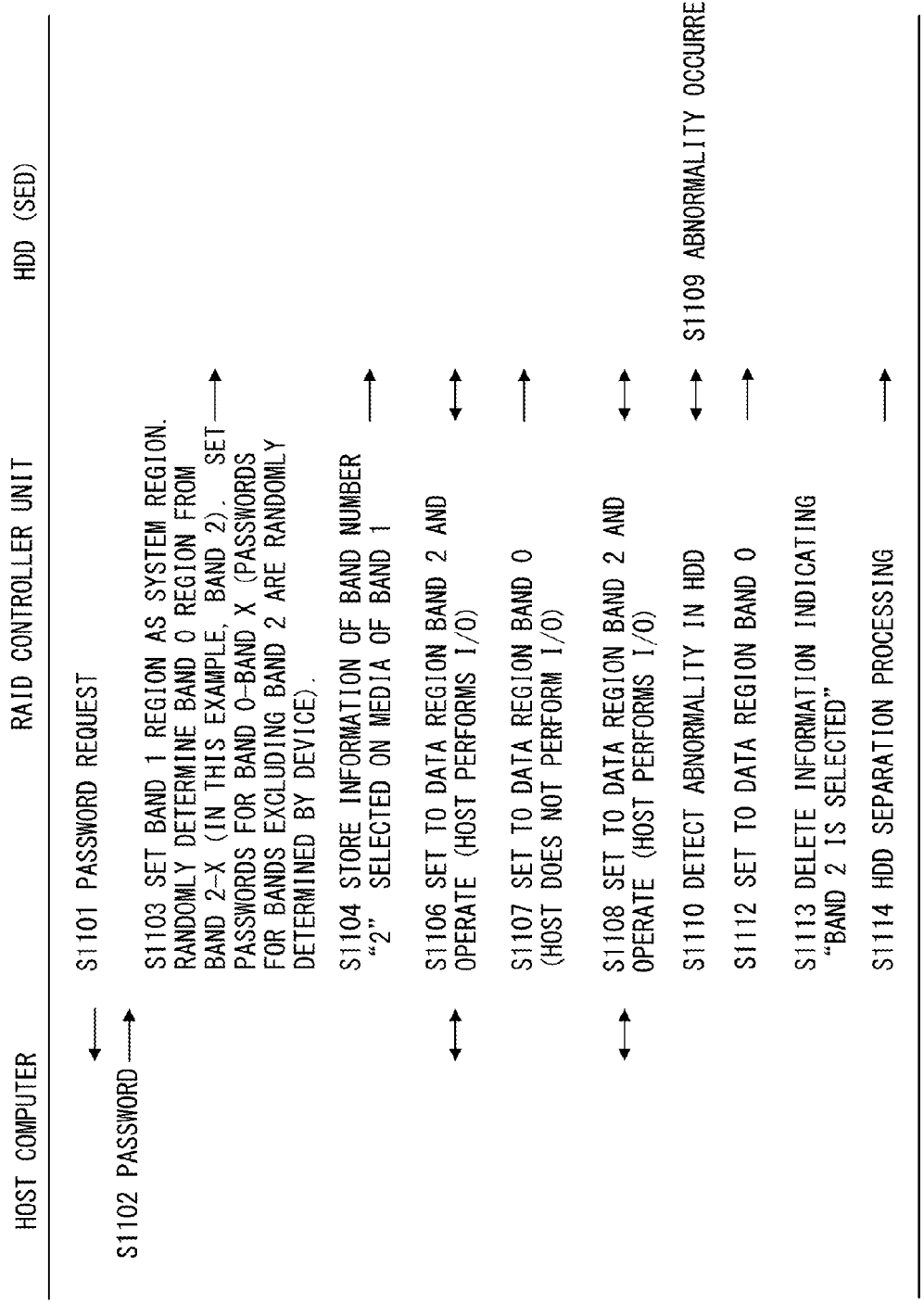
FIG. 12 is a sequence diagram from the default setting of the HDD (SED) to the HDD (SED) being separated from the RAID device.
Figure 13:
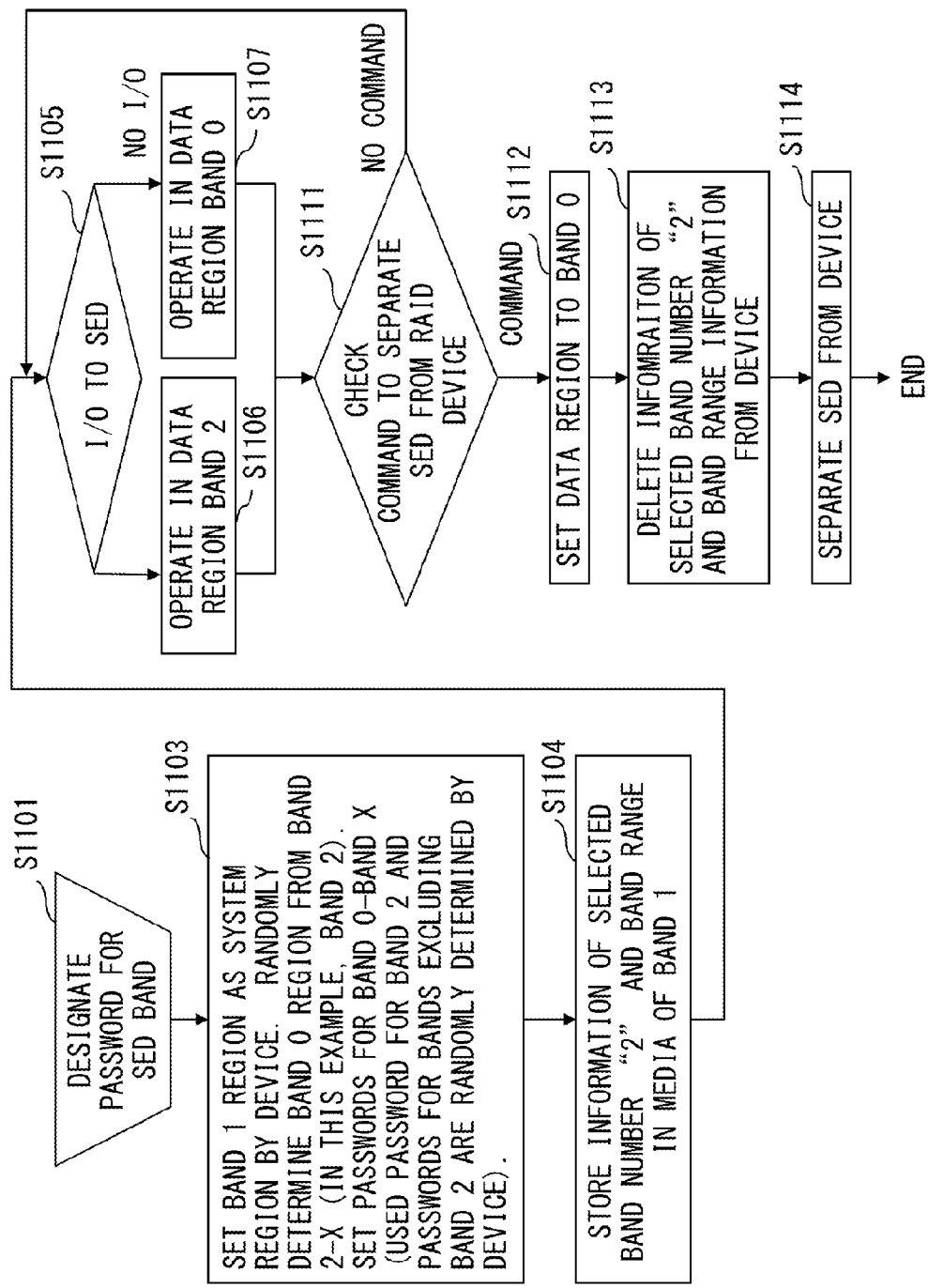
FIG. 13 is a flowchart from the default setting of the HDD (SED) to the HDD (SED) being separated from the RAID device.

FIG. 12 is a sequence diagram from the start of use of an SED to the HDD (SED) 309 being separated from the RAID device 308. FIG. 13 is a flowchart from the start of use of an SED to the HDD (SED) 309 being separated from the RAID device 308. The numbers assigned to the steps are the same if the steps correspond to one another in FIG. 12 and FIG. 13.

In order to set an SED from the host computer 301, the RAID controller unit 302 firstly requests a password of a band used as a data region (S1101). The host computer 301 inputs the password of the band used as a data region to the RAID controller unit 302 (S1102).

Next, the RAID controller unit 302 establishes a band used as a system region (the band 1 in the present embodiment) (S1103). More specifically, the RAID controller unit 302 determines the start LBA and the LBA range of the band 1 for example, and creates a password of the band 1. Based on the determined values, the RAID controller unit 302 sets values in a band number 604, a start LBA 605 of the band 1, the LBA range 606 of the band 1, and the password 607 of the band 1 of the management information in the management information storage unit 310. Moreover, the RAID controller unit 302 sets the range information of the band 1 in the region management table. Furthermore, the RAID controller unit 302 associates the password information of the band 1 with the band number of the band 1 and stores it in the authentication information storage unit 315.

Next, the RAID controller unit 302 randomly determines a region to be used as a data region from among the band 2 to the band X (the band 2 in the present embodiment).

Afterward, the determined information of the band 2 is stored in the system region of band 1 (S1104). More specifically, the band number of band 2 is stored in the band number 502, and the value of the starting LBA of the band 2 is stored in the start LBA 503 and the value of the LBA range of the band 2 is stored in the LBA range 504.

The RAID controller unit 302 stores the information of the band 2 in the management information storage unit 310. More specifically, the RAID controller unit 302 stores the information of the band 2 in each of the band number 608, the start LBA 609 of the band 2, the LBA range 610 of the band 2, and the password 611 of the band 2 of the management information in the management information storage unit 310. Here, the password stored in the password 611 of the band 2 is a password input by the host computer 301 in S1102. The RAID controller unit 302 sets the value of the valid bit 612 of the band 2 to "1".

When there are plural bands used as a data region, information of all bands used as a data region is stored in the management region of the band 1 and the management information storage unit 310.

In addition, the RAID controller unit 302 associates the password information of the band 2 with the band number of the band 2 and stores it in the authentication information storage unit 315.

Next, passwords for the band 0 to band X excluding the band 2 are randomly created by the RAID controller unit 302.

The created passwords are stored in the management information storage unit 310 together with the band number and the range information. More specifically, the information on the band 0 to the band X excluding the band 2 is stored in the band number, the start LBA, the LBA range, and the password, each corresponding to each of the bands in the management information in the management information storage unit 310. The RAID controller unit 302 also associates the created password information with each band number and stores it in the authentication information storage unit 315.

Next, the description shifts to an explanation of workings during operation.

During operations, the RAID controller unit 302 determines whether or not a data input/output request is generated from the host computer 301 to the HDD (SED) 309 at intervals of a certain time period (S1105).

When a data input/output request is generated, the region of the band 0 is set to be the band 2 as illustrated in FIG. 9A. More specifically, the RAID controller unit 302 firstly confirms a value of the valid bit of the management information in the management information storage unit 310. The RAID controller unit 302 determines a band with the value of the valid bit being 1 to be a band to be used as a data region (the band 2 in the present embodiment). The RAID controller unit 302 acquires the information of the start LBA and the LBA range of the band 2 from the management information storage unit 310, associates the acquired range information with the band number of the band 2, and sets it in the region management table. Next, password authentication is performed by the password authentication unit 316. The RAID controller unit 302 inputs the password of the band 2 stored in the management information storage unit 310 to the password authentication unit 316. The password authentication unit 316 compares the input password with the password of the band 2 stored in the authentication information storage unit 315. When the comparison result is that the passwords are in agreement, the lock of the band 2 is released. Afterward, data input/output is performed on the region of the band 2 (S1106).

When no input/output of the HDD (SED) 309 is generated for a certain period of time, the RAID controller unit 302 sets the range information of the band 2 to 0 in the region management table (rewrites the band 2 to the band 0) (S1107).

Furthermore, when data input/output of the HDD (SED) 309 is generated, password authentication is performed, and if the authentication is successful, the band 2 is once again set to the band number corresponding to the range information of the band 2 in the region management table (the band 0 is rewritten into the band 2), and data input/output is performed in the region of the band 2 (S1108). Here, similarly to S1106, the information of the management information storage unit 310 is used for the settings of the band 2.

Next, the description shifts to an explanation of a case in which an abnormality occurs in the HDD (SED) 309.

When an abnormality occurs in the HDD (SED) 309 (S1109), the RAID controller unit 302 detects the abnormality in the HDD (SED) 309 (S1110). At that time, when a command to separate the HDD (SED) 309 from the RAID device 308 is issued (S1111), preprocessing to separate the HDD (SED) 309 is performed.

If the band 2 is established at a point in time at which a command to separate the HDD (SED) 309 is issued, the RAID controller unit 302 sets the value of the range information of the band 2 to 0 in the region management table (rewrites the band 2 into the band 0) (S1112).

Afterward, the RAID controller unit 302 deletes information which indicates that the band 2 is selected as a data region from the management information storage unit 310 (S1113). More specifically, the RAID controller unit 302 deletes information of the band number 608, the start LBA 609 of the band 2, the LBA range 610 of the band 2, and the password 611 of the band 2 in the management information stored in the management information storage unit 310. Furthermore, the RAID controller unit 302 sets the value of the valid bit 612 to "0". As a result of these deletions, the band number and the LBA range information which were used as a data region will not remain in the storage, and therefore the security is enhanced.

Afterward, the HDD (SED) 309 is separated from the RAID device 308 (S1114).

Figure 14:
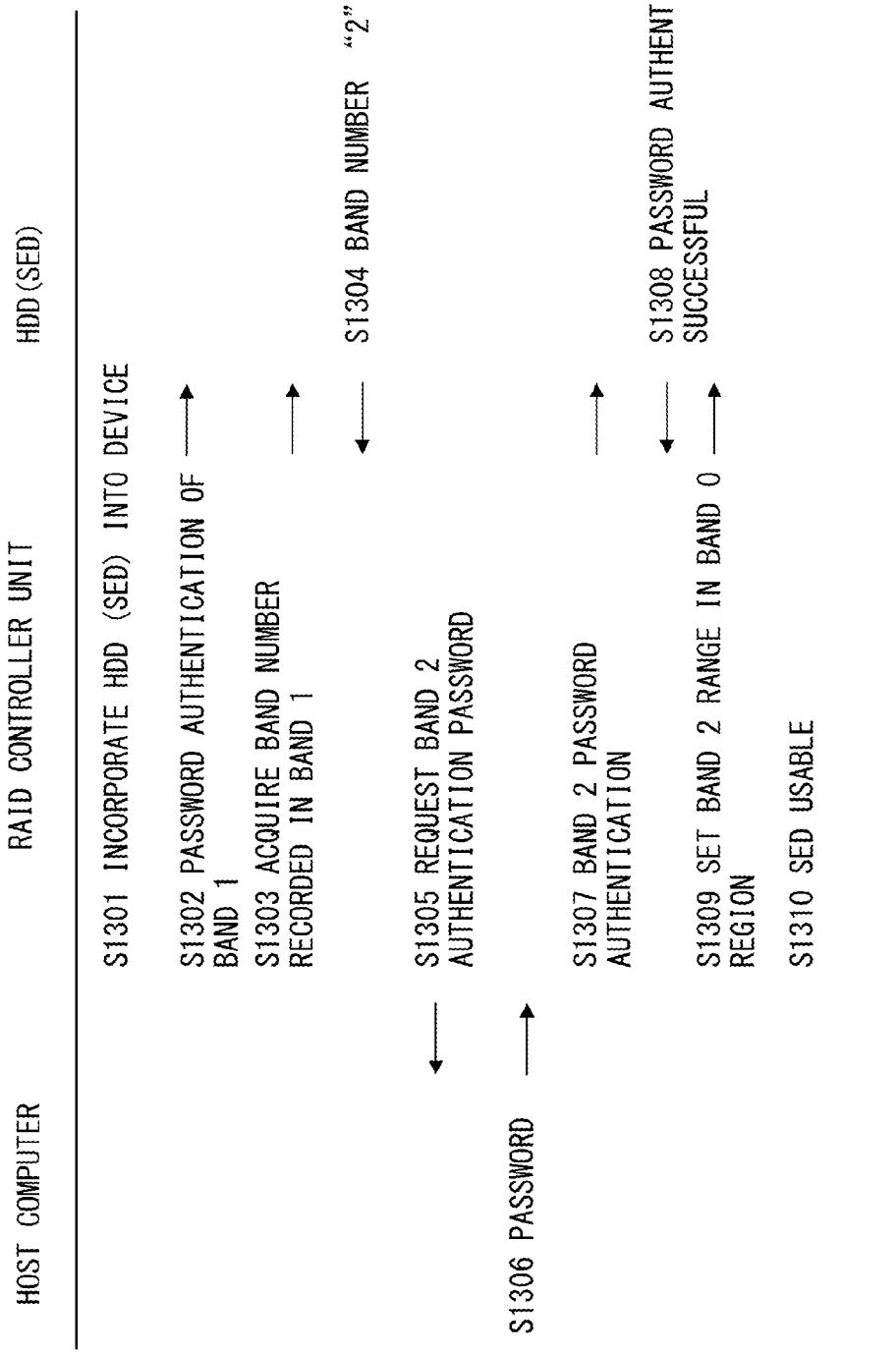
FIG. 14 is a sequence diagram from a point in time of re-mounting the HDD (SED) to the RAID device to a point in time at which the HDD (SED) becoming usable.

FIG. 14 is a sequence diagram from a step in which the HDD (SED) 309 is mounted once again on the RAID device 308 to a step in which the HDD (SED) 309 becomes usable. FIG. 15 is a flowchart illustrating a sequence from a step in which the HDD (SED) 309 is mounted once again on the RAID device 308 to a step in which the HDD (SED) 309 becomes usable. The numbers assigned to the steps are the same if the steps correspond to one another in FIG. 14 and FIG. 15.

When the HDD (SED) 309 is incorporated into the RAID device 308 (S1301), firstly, password authentication of the band 1 that is a system region is performed (S1302). In other words, the RAID controller unit 302 inputs the password information stored in the password 607 of the band 1 in the management information storage unit 310 to the password authentication unit 316. The password authentication unit 316 compares the input password information with the password information of the band 1 stored in the authentication information storage unit 315, and if the comparison result is that the passwords are in agreement, the lock of the band 1 is released.

When the authentication of the band 1 is successful, the RAID controller unit 302 acquires from the band 1 information of the band number, the start LBA, and the LBA range of the band 2 used as a data region (S1303). More specifically, the RAID controller unit 302 acquires the information of the band number 502, the start LBA 503, and the LBA range 504 stored in the band 1 (S1304). (When there are other bands used as a data region in addition to the band 2, information is acquired from the band number 505, the start LBA 506, the LBA range 507 . . . . )

Next, the RAID controller unit 302 stores the acquired information of the band 2 in the band number 608, the start LBA 609 of the band 2, and the LBA range 610 of the band 2. The RAID controller unit 302 sets the value of the valid bit 612 of the band 2 to be "1".

Afterward, the RAID controller unit 302 requests that the host computer 301 send the authentication password of the band 2 (S1305).

The host computer 301 inputs the password of the band 2 to the RAID controller unit 302 (S1306).

Next, the RAID controller unit 302 stores a password received from the host computer 301 in the password 611 of the band 2. Next, authentication to release the lock of the band 2 is performed (S1307). More specifically, the RAID controller unit 302 inputs the password information stored in the password 611 of the band 2 to the password authentication unit 316. The password authentication unit 316 compares the input password information with the password information of the band 2 stored in the authentication information storage unit 315, and when the comparison result is that the passwords are in agreement, the lock of the band 2 is released (S1308).

When the password authentication is successful, the RAID controller unit 302 sets the region of the band 0 to be the band 2 (S1309). Details of the method for this setting are the same as the method of setting in S1106.

After the above processing, the HDD (SED) 309 becomes readable and writable (S1310).

Note that when there is more than one band used as a data region, the processing from S1303 to S1309 is repeated for each of the bands used as a data region and the HDD (SED) 309 is usable in S1310.

Figure 16:
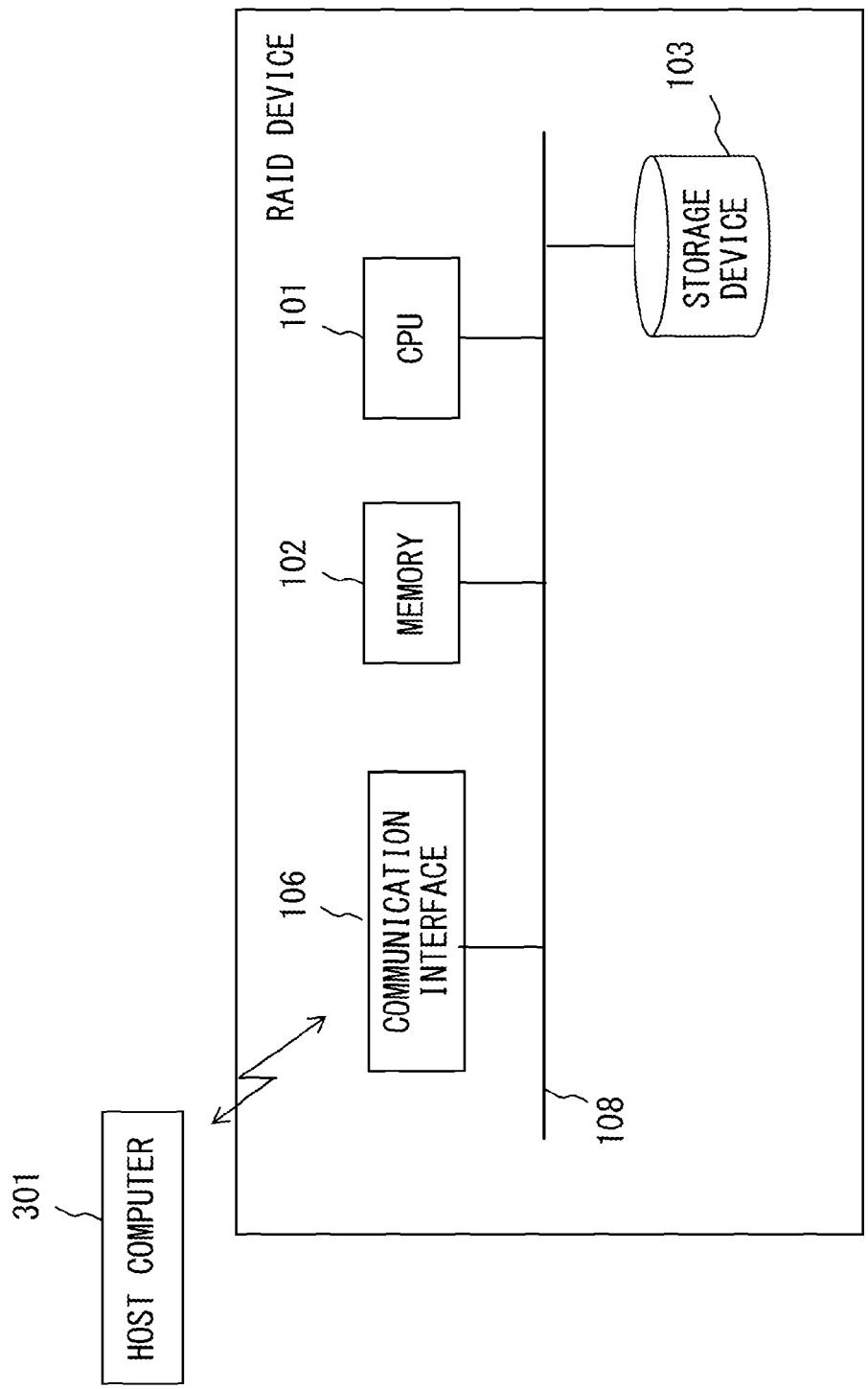
FIG. 16 illustrates a hardware configuration of the storage system to realize the present embodiment.

FIG. 16 is a diagram illustrating a hardware configuration of the storage system to realize the information storage device of the present embodiment. A RAID device includes a CPU 101, a memory 102, a storage device 103, and a communication interface 106, as illustrated in FIG. 16. Note that the CPU 101, the memory 102, the storage device 103, and the communication interface 106 are connected with one another via a bus 108 as an example.

The CPU 101 provides a part of or all of the functions of the access controller unit 4, the identification information rewrite unit 5, and the acquisition unit 8 by executing programs that includes the procedures in the above-described flowcharts by using the memory 102.

The memory 102 is for example a semiconductor memory, and includes a RAM region and a ROM region. The memory 102 stores programs related to the present embodiment. Information stored in the management information storage unit 310 may be stored in the memory 102. Note that the memory 102 may be a semiconductor memory such as a flash memory.

The RAID controller unit 302 and the IO controller unit 303 control the entire RAID device 308 by using the CPU 101 and the memory 102 and controls input/output processing of the HDD (SED) 309.

The storage device 103 stores data input from the host computer 301.

The communication interface 106 transmits/receives data between the host computer 301 and the HDD (SED) 309 via a network in accordance with an instruction of the CPU 101 or an instruction of the host computer 301.

A control program of the present embodiment is provided to a storage system in the following forms as examples.
(1) Pre-installed in the memory 102.
(2) Provided from the host computer 301.

Furthermore, a part of the storage device of the present embodiment may be realized by hardware. Alternatively, the storage device of the present embodiment may be realized by a combination of software and hardware.

Furthermore, the encryption engine 311, the authentication information storage unit 315, and the password authentication unit 316 may be realized by chips (semiconductor components) mounted on a substrate of the HDD (SED) 309.

In the present embodiment, the band 1 is designated as a band used as a system region, and the band 2 is designated as a band used as a data region. However, bands with any band numbers can be a system region or a data region.

Moreover, in the present embodiment, the password that is described as being created by the RAID controller unit 302 may be created by a user of the RAID device 308. The password of a band used as a data region is described as being set by a user of the RAID device 308, but the RAID controller unit 302 may also create the password.

Furthermore, the number of the bands is described as 1024. However, the number of bands is not limited to this value.

Note that the present embodiment is not limited to the above-described embodiment, but various forms or embodiments are also possible without departing from the gist of the present embodiment.

The present embodiment allows for security enhancement.

All examples and conditional language provided herein are intended for the pedagogical purposes of aiding the reader in understanding the invention and the concepts contributed by the inventor to further the art, and are not to be construed as limitations to such specifically recited examples and conditions, not does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information storage device comprising:
    a storage unit to which a storage region is assigned;
    a first management information storage unit that stores address information indicating an address range of the storage region in association with identification information identifying the storage region; and
    a processor that executes a procedure, the procedure including:
        acquiring first address information corresponding to first identification information from the first management information storage unit and accesses a storage region of a first address range indicated by the first address information by using a first encryption key corresponding to the first identification information; and
        rewriting the first identification information stored in the first management information storage unit to second identification information corresponding to second address information indicating a second address range and a second encryption key.

2. The information storage device according to claim 1, the information storage device further comprising:
   a second management information storage unit that store address information indicating an address range of the storage region in association with the first identification information identifying the storage region,
   wherein the processor rewrites the identification information in the first management information storage unit corresponding to the address range of the storage region indicated by the address information stored in the second management information storage unit to the first identification information.

3. The information storage device according to claim 1, wherein the processor rewrites the identification information when access to the storage region does not occur for a certain period of time.

4. The information storage device according to claim 1, wherein
   the storage unit is a removable storage device,
   the processor rewrites the identification information when a command to separate the storage unit is received from an outside.

5. The information storage device according to claim 1, the information storage device further comprising:
   a first authentication information storage unit that stores first authentication information set in association with the identification information, wherein
   the processor acquires second authentication information, and
   the information storage device further comprises an authentication unit that checks the second authentication information acquired from the acquisition unit against the first authentication information stored in the first authentication information storage unit and that allows the access controller unit to access the storage unit when a result of the check is that the information is in agreement.

6. The information storage device according to claim 1, the information storage device further comprising:
   a second authentication information storage unit that stores third authentication information to allow the identification information rewrite unit to access the second management information storage unit, wherein
   the first authentication information storage unit stores fourth authentication information to check against the third authentication information, and
   the authentication unit acquires the third authentication information stored in the second authentication information storage unit, checks the fourth authentication information stored in the first authentication information storage unit against the acquired third authentication information, and allows the identification information rewrite unit to access the second management information storage unit when a result of the check is that the information is in agreement.

7. A computer-readable recording medium having stored therein a program for causing a computer to execute a process for controlling an information storage device, the process comprising:
   acquiring first address information corresponding to first identification information from a first management information storage unit that stores address information in association with identification information to identify a storage region and accessing a storage region of the first address range indicated by the first address information by using a first encryption key corresponding to the first identification information; and
   rewriting the first identification information stored in the first management information storage unit to second identification information corresponding to second address information indicating a second address range and a second encryption key.

8. The computer-readable recording medium according to claim 7, wherein
   in rewriting the identification information, identification information in the first management information storage unit corresponding to a address range of the storage region indicated by address information stored in a second management information storage unit that stores address information indicating the address range of the storage region in association with the first identification information identifying the storage region is written to the first identification information.

9. The computer-readable recording medium according to claim 7, wherein in rewriting the identification information, the identification information is rewritten when access to the storage region does not occur for a certain period of time.

10. The computer-readable recording medium according to claim 7, the process further comprising:
    acquiring third authentication information stored in a second authentication information storage unit, the third authentication information enabling access to the second management information storage unit, checking fourth authentication information stored in the first authentication information storage unit against the acquired third authentication information, and enabling access to the second management information storage unit when a result of the checking is that the information is in agreement.

11. A control method of an information storage device, the control method comprising:
    acquiring first address information corresponding to first identification information from a first management information storage unit that stores address information in association with identification information that identifies a storage region and accessing a storage region of the first address range indicated by the first address information by using a first encryption key corresponding to the first identification information; and
    rewriting the first identification information stored in the first management information storage unit to second identification information corresponding to second address information indicating a second address range and a second encryption key.

12. The control method according to claim 11, wherein
    in rewriting the identification information, identification information in the first management information storage unit corresponding to a address range of the storage region indicated by address information stored in a second management information storage unit that stores address information indicating the address range of the storage region in association with the first identification information identifying the storage region is written to the first identification information.

13. The control method according to claim 11, wherein in rewriting the identification information, the identification information is rewritten when access to the storage region does not occur for a certain period of time.

14. The control method according to claim 11, the control method further comprising:
    acquiring third authentication information stored in a second authentication information storage unit, the third authentication information enabling access to the second management information storage unit, checking fourth authentication information stored in the first authentication information storage unit against the acquired third authentication information, and enabling access to the second management information storage unit when a result of the checking is that the information is in agreement.

* * * * *